United States Patent
Oesterling et al.

(10) Patent No.: US 7,983,690 B2
(45) Date of Patent: Jul. 19, 2011

(54) METHOD AND SYSTEM FOR GEOGRAPHIC BOUNDARY TIME TRIGGERING OF COMMUNICATION WITH A MOBILE VEHICLE

(75) Inventors: Christopher L. Oesterling, Troy, MI (US); Nathan D. Ampunan, Novi, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 11/088,504

(22) Filed: Mar. 24, 2005

(65) Prior Publication Data
US 2006/0217848 A1 Sep. 28, 2006

(51) Int. Cl.
*H04W 24/00* (2009.01)

(52) U.S. Cl. .............. 455/456.1; 455/414.1; 455/456.2; 455/456.3; 455/456.5; 455/456.6; 455/41.2; 701/29; 701/30; 340/988; 340/989; 340/991; 340/992; 340/994

(58) Field of Classification Search ............. 455/414.1, 455/414.3, 421, 422.1, 404.2, 41.2, 456.1–456.6, 455/575.9, 569.2, 414.2, 412.1; 340/988, 340/426.19, 426.2, 426.21, 540, 995.1, 989, 340/992, 993, 994, 426.1, 426.18, 430, 932.2, 340/425.5, 541, 426.16, 438, 439, 440, 441, 340/449, 453, 455, 995.19, 933, 991, 457.4, 340/463; 705/26; 701/300, 201, 209, 210, 701/214, 200, 213, 29, 30; 709/217, 218, 709/219
See application file for complete search history.

(56) References Cited

U.S. PATENT DOCUMENTS

| | | | | |
|---|---|---|---|---|
| 5,157,610 A | * | 10/1992 | Asano et al. | 701/32 |
| 5,808,565 A | * | 9/1998 | Matta et al. | 340/994 |
| 5,963,130 A | | 10/1999 | Schlager et al. | |
| 6,181,994 B1 | * | 1/2001 | Colson et al. | 701/33 |
| 6,259,381 B1 | * | 7/2001 | Small | 340/988 |
| 6,356,956 B1 | * | 3/2002 | Deo et al. | 719/318 |
| 6,487,494 B2 | * | 11/2002 | Odinak et al. | 701/202 |
| 6,717,508 B2 | * | 4/2004 | Sashida | 340/5.72 |
| 6,785,539 B2 | * | 8/2004 | Hale et al. | 455/422.1 |
| 6,807,427 B1 | * | 10/2004 | Sakamoto et al. | 455/456.1 |
| 6,885,311 B2 | * | 4/2005 | Howard et al. | 340/932.2 |
| 6,980,131 B1 | * | 12/2005 | Taylor | 340/994 |
| 6,985,747 B2 | * | 1/2006 | Chithambaram | 455/456.5 |
| 7,019,670 B2 | * | 3/2006 | Bahar | 340/932.2 |
| 7,058,395 B2 | * | 6/2006 | Dowling et al. | 455/414.2 |
| 7,271,738 B2 | * | 9/2007 | Berstis et al. | 340/932.2 |
| 2002/0116123 A1 | * | 8/2002 | Lampe et al. | 701/213 |
| 2003/0060953 A1 | * | 3/2003 | Chen | 701/33 |
| 2004/0192351 A1 | * | 9/2004 | Duncan | 455/456.3 |
| 2004/0214597 A1 | * | 10/2004 | Suryanarayana et al. | 455/552.1 |
| 2005/0024189 A1 | * | 2/2005 | Weber | 340/425.5 |
| 2005/0059410 A1 | * | 3/2005 | Trossen et al. | 455/456.1 |
| 2005/0096020 A1 | | 5/2005 | Oesterling | |
| 2005/0159988 A1 | * | 7/2005 | Ramseyer | 705/5 |
| 2005/0168352 A1 | * | 8/2005 | Tomer | 340/932.2 |
| 2005/0176482 A1 | * | 8/2005 | Raisinghani et al. | 455/575.9 |
| 2005/0215282 A1 | | 9/2005 | Oesterling | |

* cited by examiner

OTHER PUBLICATIONS

U.S. Appl. No. 10/806,497, filed Mar. 23, 2004, Oesterling et al.

*Primary Examiner* — Olumide T Ajibade Akonai
(74) *Attorney, Agent, or Firm* — Anthony L. Simon; Reising Ethington P.C.

(57) ABSTRACT

A method for establishing communication with a mobile vehicle includes determining whether the mobile vehicle is within a predetermined geographic region and initiating a time trigger based on the determination. The method further includes initiating communication between the mobile vehicle and a central node via a wireless connection based on the time trigger.

19 Claims, 3 Drawing Sheets

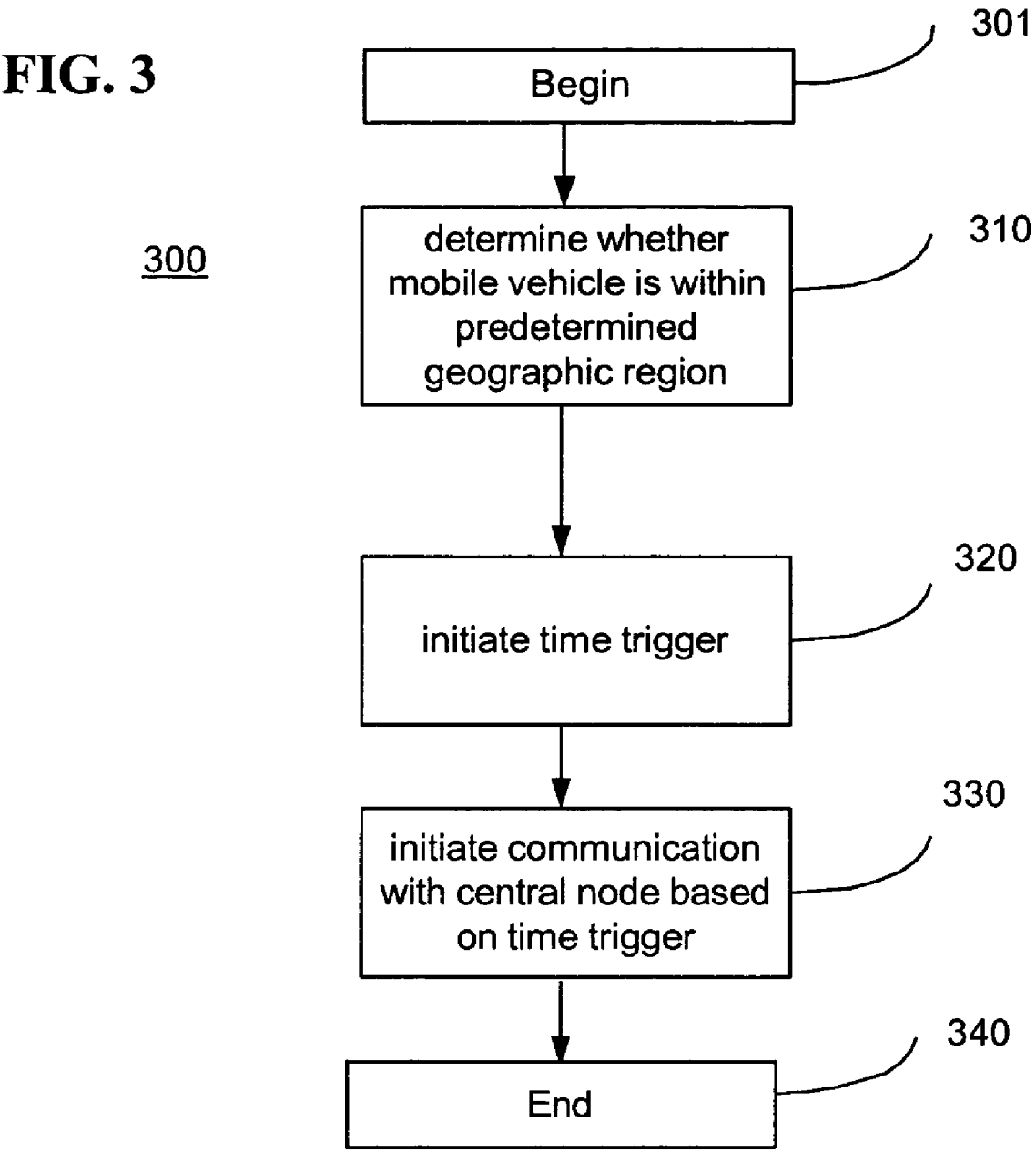

METHOD AND SYSTEM FOR GEOGRAPHIC BOUNDARY TIME TRIGGERING OF COMMUNICATION WITH A MOBILE VEHICLE

FIELD OF THE INVENTION

The present invention generally relates to initiating communication between a mobile vehicle and a central location.

BACKGROUND OF THE INVENTION

Inclusion of wireless communication systems within mobile vehicles provides an opportunity to communicate between the vehicle and a central location. For example, Diagnostic Trouble Codes ("DTC's") are often generated and stored during operation of a mobile vehicle, and review of a list of the stored codes may assist in improving vehicle operation. In another example, operators of such vehicles may subscribe to services, such as navigational aids, that may be provided using wireless connections.

Wireless communication can include cellular connections, as well as short-range wireless connections such as an 802.11 connection. In order to initiate a communication, the communication is typically either triggered automatically as a result of a trigger, or by direct user request. In addition to wireless communication capacity, many vehicles are also equipped with GPS equipment to determine a location of the vehicle, and location-based triggers for instantiating a communication are common, but may result in unnecessary communication attempts.

The present invention overcomes these disadvantages and advances the state of the art in navigation systems.

SUMMARY OF THE INVENTION

One aspect of the present invention provides a method for establishing communication with a mobile vehicle including determining whether the mobile vehicle is within a predetermined geographic region and initiating a time trigger based on the determination. The method further includes initiating communication between the mobile vehicle and a central node via a wireless connection based on the time trigger.

Another aspect of the invention provides a computer readable medium including computer readable code for establishing communication with a mobile vehicle including computer readable code for determining whether the mobile vehicle is within a predetermined geographic region and computer readable code for initiating a time trigger based on the determination. The medium further includes computer readable code for initiating communication between the mobile vehicle and a central node via a wireless connection based on the time trigger.

Another aspect of the invention provides a system for establishing communication with a mobile vehicle including means for determining whether the mobile vehicle is within a predetermined geographic region and means for initiating a time trigger based on the determination. The system further includes means for initiating communication between the mobile vehicle and a central node via a wireless connection based on the time trigger.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

FIG. 3 illustrates one embodiment of a method for establishing communication with a mobile vehicle in accordance with the present invention.

DETAILED DESCRIPTION OF THE PREFERRED EMBODIMENTS

Figure 1:
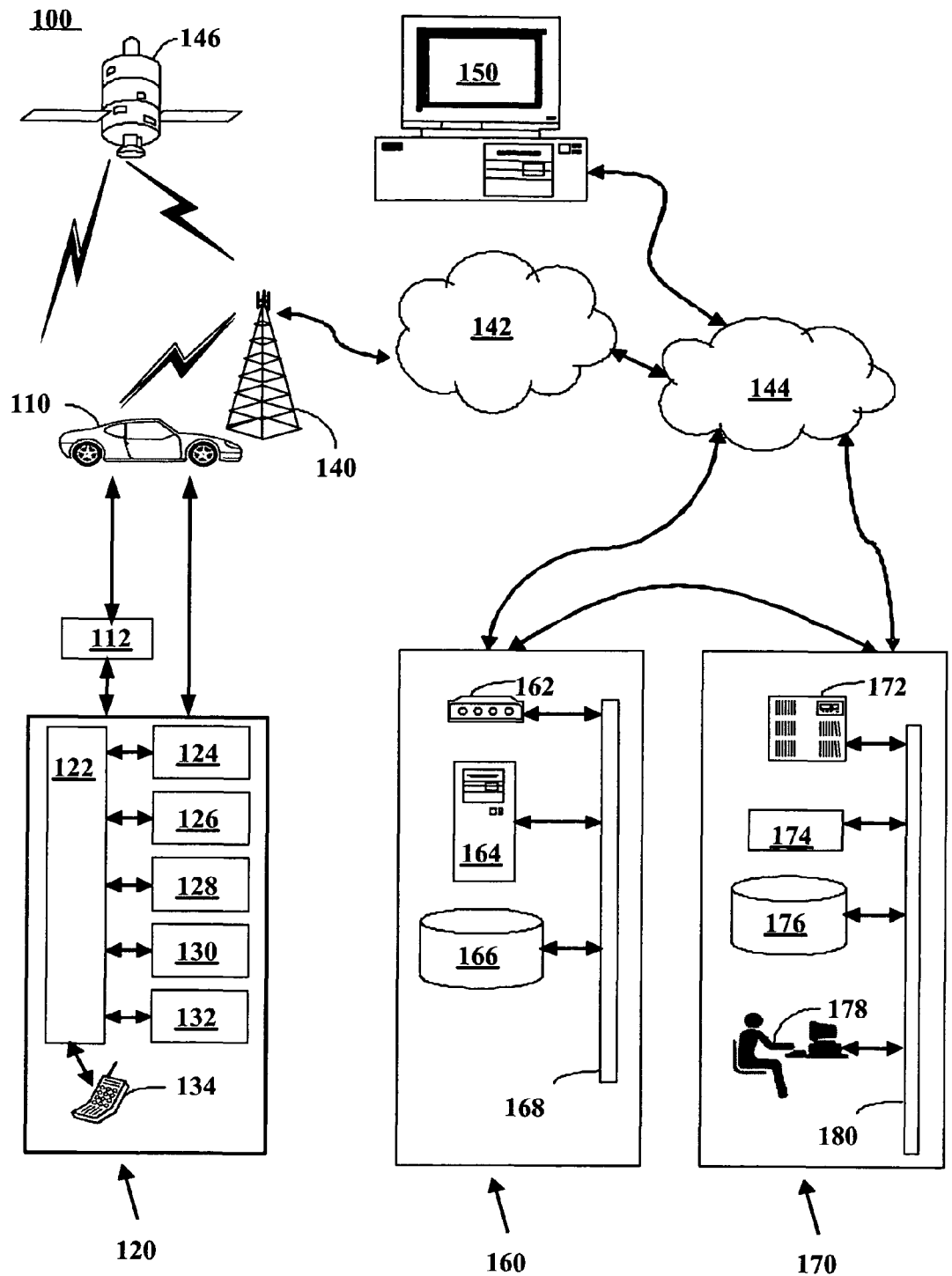
FIG. 1 illustrates an operating environment for a method for establishing communication with a mobile vehicle.

FIG. 1 illustrates an operating environment for a mobile vehicle communication system ("MVCS") 100 for navigation. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. For example, communication services manager 174 may include at least one digital and/or analog modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2A:
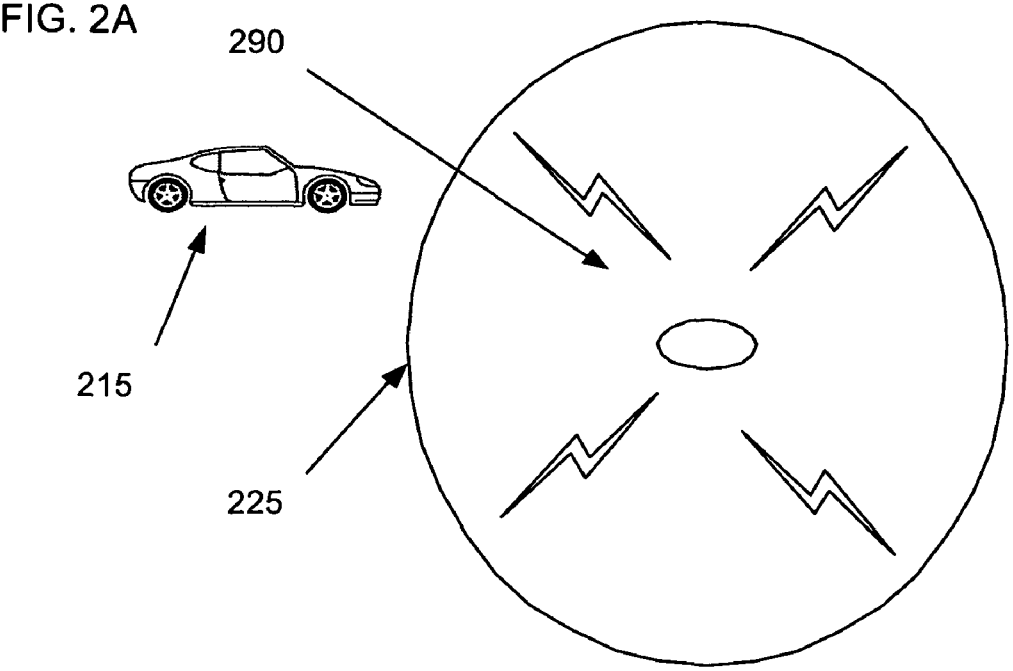
FIGS. 2A and 2B illustrates a schematic diagram of a vehicle located outside and within a predetermined geographic area.
Figure 2B:
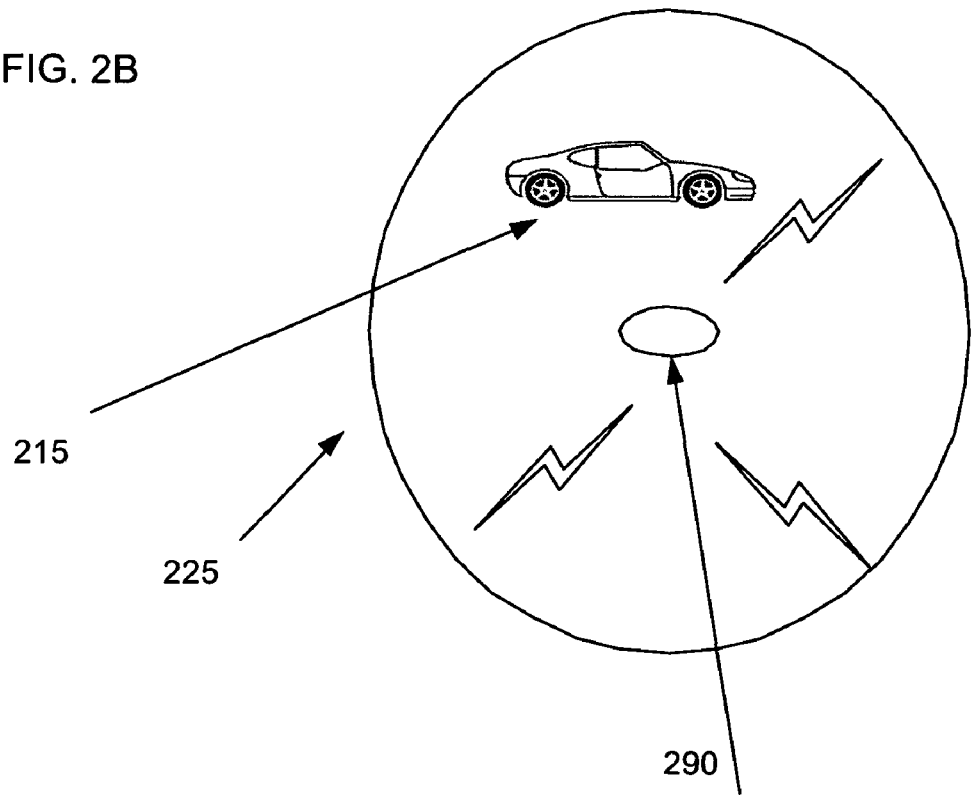

FIGS. 2A and 2B illustrate a schematic diagram of a vehicle located outside and within a predetermined geographic area. In FIG. 2A, vehicle 215 (implemented as MVCU 110 in one embodiment) is shown outside a predetermined geographic region 225, whereas vehicle 215 is shown inside a predetermined geographic region 225 in FIG. 2B. Device 290 is a device configured for wireless communication with a telematics unit. In one embodiment, device 290 is configured for short-range communications, such as an FCC Part 15 configured device. In another embodiment, device 290 is configured for communications over a large distance, such as a cellular network, satellite network or other such communication protocol. In one embodiment, device 290 is a central node. In other embodiments, the central node is a call center, such as call center 170.

A predetermined geographic region can be any location surrounding a specified location. In one embodiment, the predetermined geographic region is the area surrounding a device configured to receive communications from a telematics unit, such as telematics unit 120. For example, in one embodiment, the predetermined geographic region is defined by a dealership that sells a particular model vehicle, and the region is defined by a communication range of a technology. For example, in embodiments operating using 802.11 communication standards, the geographic region will be the region that extends approximately 300 feet around the dealership 802.11 configured device 290. In other embodiments, directional antennas are used to focus and extend the signal in a desired direction. In embodiments operating using, for example, cellular technologies to communicate with the dealership, a geographic region will not be constrained in geographic reach to the same extent as with distance-limited technologies such as 802.11, and the geographic region may be predefined to be, for example, 500 feet surrounding a particular GPS location near the dealership service bay. In embodiments operating using GPS coordinates to define the predetermined geographic region, the GPS coordinates may define any appropriate shape, such as substantially circular, polygonal, or other shapes.

The predetermined geographic region may be any geographic position that is desired to serve as a base for computing time. In various embodiments, the geographic region may be a dealership, service facility, maintenance facility, retail establishment, parking lot, rental car lot, residential driveway, or a point of interest. A point of interest may be, for example, a gate to a national park, a gate to a drive-in movie, a mile marker on a road, or any geographic point.

FIG. 3 illustrates one embodiment of a method 300 for initiating communication with a vehicle in accordance with the instant invention. Method 300 begins at 301.

Method 300 determines whether the mobile vehicle is within a predetermined geographic region at step 310. In embodiments wherein the predetermined geographic region is defined by a communication range, the determination of whether a mobile vehicle is within the predetermined geographic region includes determining whether a communication signal is received by the mobile vehicle. In such an embodiment, device 290 includes a communication initiation request that identifies the communication and broadcasts the communication initiation request in a substantially continuous fashion. In other embodiments, the telematics unit broadcasts a communication initiation request substantially continuously, and device 290 will only receive the communication initiation request when the telematics unit is within the communication range.

In one embodiment wherein the predetermined geographic region is defined by GPS coordinates, the mobile vehicle determines a current GPS location, and then determines whether the current GPS location is within a predetermined geographic region. Determining a current GPS location, in one embodiment, comprises polling a GPS unit (such as GPS unit 126). In another embodiment, determining a current GPS location comprises polling a vehicle network (such as network 112) to locate a GPS location stored in memory or from the GPS unit.

Based on the determination whether the mobile vehicle is within a predetermined geographic region, a time trigger is initiated at step 320. In one embodiment, the time trigger is operated at the mobile vehicle, for example, in telematics unit, or a device in communication with the telematics unit. In another embodiment, the time trigger is operated at the central node, or at the device 290. A time trigger is any device or software configured to track a cumulative sum of elapsed time. For example, a time trigger may be an electronic stopwatch. The time trigger may count any appropriate measure of time, such as minutes, seconds or hours. In another embodiment, the time trigger operates by counting processor cycles analogous to discrete time units. In other embodiments, time references are extracted from, for example, signals from a GPS satellite, extracted from a CDMA-chip set within a configured phone such as phone 136, and a real time clock associated with processor 122 (not shown).

The time trigger may be initiated either in response to a vehicle entering the predetermined geographic region, or in response to the vehicle exiting the predetermined geographic region. Thus, for example, the time trigger is initiated, in one embodiment, by a vehicle pulling up to a stop light outside a dealership (i.e. entering the predetermined geographic region). In another embodiment, the vehicle exiting a dealership lot initiates the time trigger.

In one embodiment, initiating the time trigger is also based on a time of day determination. The time of day determination, in one embodiment, determines if the current time is outside of a predetermined time. For example, in one embodiment, the time trigger is only initiated when a vehicle exits a dealership lot between 9 PM and 5 AM. In another embodiment, the time trigger is only initiated if the vehicle exits a dealership lot and the time is not between 8 AM and 7 PM.

In one embodiment, the time trigger tracks continuous time data. In such an embodiment, the time trigger is reset when the vehicle is no longer within (or has returned to) the predetermined geographic area. In another embodiment, the time trigger tracks collective time data. In such an embodiment, the time trigger is not reset when the vehicle is no longer within (or has returned to) the predetermined geographic area.

Based on the initiation of the time trigger, method 300 initiates communication between the mobile vehicle and a central node via a wireless connection at step 330. Communication between the mobile vehicle and the central node may occur using any appropriate technology, such as cellular or short-range wireless technologies such as FCC Part 15 devices.

In one embodiment, DTC's are communicated between the mobile vehicle and the central node. In other embodiments, a service request is communicated. In other embodiments, a request for a service history of the vehicle is requested.

In yet another embodiment, a particular bit of information or a connection is requested. For example, passing an entry gate to a national park may trigger a communication for a map or an electronic guidebook to the national park. In another example, passing an entry gate to a drive-in movie theater may trigger a connection seeking an audio feed for a movie being shown at the theater. In yet another embodiment, an additional navigation route is sent in response to a communication.

Communication between the mobile vehicle and central node is initiated when the time trigger indicates that the span of elapsed time is substantially greater than or equal to a predetermined span of time. Thus, during step 330, method 300 determines the span of time elapsed since initiating the time trigger, and initiates communication when the span of time equals or exceeds a predetermined threshold.

The predetermined threshold is a span of time to reduce undesired communication connections. For example, initiating communication with a vehicle that is merely traveling by a dealership without entering the dealership is undesirable in certain circumstances. Thus, a predetermined threshold of, for example, 5 minutes will reduce the incidence of opening a communication channel with a vehicle that is stopped at a stop light outside a dealership. In another example, opening a communication channel with a vehicle that is being taken for a test drive prior to a vehicle sales is undesirable in certain circumstances, such that a predetermined threshold of 2 hours that a vehicle be absent from a dealership lot during the hours that dealership is open for business (for example, 8 AM through 7 PM) may be appropriate.

In another example, a predetermined threshold of 15 minutes that a vehicle is absent from a dealership lot when the dealership is closed (for example, 9 PM through 6 AM) may be appropriate and increase incidence that vehicles stolen from a vehicle lot are recovered. In response to a time trigger initiated communication potentially indicative of a vehicle theft from a dealership (i.e. the vehicle exits a dealership lot for more than 15 minutes between 9 PM and 6 AM), the central node may initiate a theft tracking procedure.

In another embodiment, a time trigger is initiated in response to a vehicle exiting a predetermined geographical region, such as a driveway. When the time trigger meets or exceeds a predetermined time period prior to the vehicle returning to the same predetermined geographical region, communication is initiated. For example, a parent loans a vehicle to a minor for the minor to depart home at 7 PM and return by midnight. Therefore, the vehicle will call the parent (i.e. initiate communication with the central node) at midnight. In the event that the vehicle returns prior to midnight, the time trigger operates as an inverse trigger, and the initiation of the communication will be cancelled. In such an embodiment, communication is initiated with the initiation of the time trigger, and the communication is completed in response to the time trigger elapsing, or the time trigger attaining a predetermined time. In certain embodiments, return of the vehicle to the predetermined geographic region operates to cancel the operation of the time trigger.

In other embodiments, a vehicle must return to and remain in the predetermined geographic region for another predetermined period of time in order to cancel the initiated communication. In such an embodiment, the driver must return the vehicle to, for example, the driveway prior to the due time (i.e. midnight), and the vehicle must remain in the driveway until, for example, 1:00 AM to cancel the initiated communication. Other embodiments may include timed waypoints that must be passed in order to cancel the initiated communication. Thus, having left the driveway at 7:00 PM, the vehicle must travel to a second destination (such as a date's home) prior to 11:00 PM, where the vehicle must be for a period of time (i.e. less than 15 minutes), and the vehicle must travel to the predetermined geographic region before the due time to cancel the initiated communication.

In another embodiment, the predetermined geographic area is a mile marker. As used herein, a "mile marker" is a point by the side of a road marking a particular start point for a route. When a vehicle passes a start mile marker, a time trigger is initiated, and the time trigger operates until an end mile marker is passed. In the event that an end mile marker is not passed within a predetermined period of time, the vehicle will initiate communication with, for example, a call center.

For example, traversing a common mountain road that is subject to falling rocks takes a typical driver 1 hour. A start mile marker and an end mile marker are arranged on opposite ends of the road such that a typical driver will take one hour to traverse the distance between the start and end mile markers. In the event that a driver does not pass the end mile marker less than one hour after passing the start mile marker, communication is initiated. This embodiment is another example of operating an inverse time trigger to prevent initiation of communication. Other systems are envisioned, including a plurality of potential routes and associated times for the route, such that passing any of a number of end mile markers within a predetermined period of time will serve to prevent initiation of communication.

It should be noted that preventing communication, as described herein, only refers to time-triggered communication, and that a user may voluntarily initiate communication for other reasons, and that communication may be initiated for other reasons based on triggers not related to the instant invention.

In one embodiment, the initiation of communications in response to a vehicle being absent from a dealership lot is terminated in response to a vehicle sale, or in response to a customer activating a new service using a particular telematics unit.

The predetermined threshold, in one embodiment, is configurable by a user, a dealership, or a manufacturer of either the vehicle or telematics unit. In another embodiment, the predetermined threshold is configurable by a wireless network service provider. Method 300 ends at 340.

The present invention may be embodied in other specific forms without departing from the spirit or essential characteristics. The described embodiments are to be considered in all respects only as illustrative and not restrictive.

What is claimed is:

1. A method for establishing communication with a mobile vehicle, the method comprising:
    defining a predetermined geographic region using global positioning system (GPS) coordinates, wherein the predetermined geographic region is a range surrounding a particular GPS coordinate location;
    detecting that the mobile vehicle is within the predetermined geographic region using GPS coordinates obtained by a telematics unit via a vehicle communication network;
    determining whether the mobile vehicle remains in the geographic region for at least a predetermined amount of time based on GPS coordinates obtained by the telematics unit via the vehicle communication network;
    initiating communication between the mobile vehicle and a central node via a wireless connection if the mobile vehicle remains in the geographic region for at least the predetermined amount of time; and
    sending service data relating to the operation of the mobile vehicle from the vehicle to the central node via the communication.

2. The method of claim 1, wherein the predetermined geographic region is an area surrounding a specified location that is selected from the group consisting of a dealership, service facility, maintenance facility, retail establishment, parking lot, rental car lot, a residential driveway, and a point of interest.

3. The method of claim 1, wherein the determining step further comprises initiating a time trigger implemented at the vehicle to determine whether the mobile vehicle stays in the geographic region for at least the predetermined amount of time.

4. The method of claim 1, wherein the detecting step comprises determining that the mobile vehicle is within the predetermined geographical region using a global positioning system (GPS) module located on the mobile vehicle and apart from the telematics unit.

5. The method of claim 3, wherein initiating communication between the mobile vehicle and a central node via a wireless connection comprises determining a span of time elapsed since initiating the time trigger, and initiating communication when the time trigger indicates that the span of time equals or exceeds the predetermined amount of time.

6. The method of claim 3, wherein the step of initiating a time trigger comprises a time of day determination.

7. The method of claim 6 wherein the time of day determination determines if the current time is outside of a predetermined time range.

8. The method of claim 1 wherein the wireless connection is selected from the group consisting of an FCC Part 15 connection and a cellular connection.

9. The method of claim 1 further comprising completing the communication in response to a time trigger.

10. A method of establishing communication with a mobile vehicle having a telematics unit, comprising the steps of:
- determining that the mobile vehicle is within a predetermined geographic region surrounding a device that is configured for wireless communication with the telematics unit of the mobile vehicle using global positioning system (GPS) coordinates, wherein the predetermined geographic region is a range surrounding a particular GPS coordinate location;
- determining whether the mobile vehicle stays within the geographic region for at least a predetermined amount of time and, if so;
- initiating wireless communication between the telematics unit and device in response to determining that the vehicle has stayed within the geographic region for at least the predetermined amount of time;
- wherein the communication relates to the operation of the vehicle and wherein each of the determining steps are carried out by either the mobile vehicle or the device.

11. The method of claim 10, wherein the device is located at a vehicle service facility capable of performing diagnostic or repair services on mobile vehicles.

12. The method of claim 11, wherein the step of determining that the mobile vehicle is within the geographic area is carried out by the vehicle service facility.

13. The method of claim 12, wherein the step of initiating wireless communication further comprises sending vehicle service data from the mobile vehicle to the vehicle service facility over the wireless communication, wherein vehicle service data includes any one or more of the following: diagnostic trouble codes (DTCs), service requests, and requests for vehicle service history.

14. The method of claim 10, wherein the determining and initiation steps are carried out by the mobile vehicle.

15. A method for establishing communication with a mobile vehicle, the method comprising:
- detecting that a mobile vehicle is within a geographic region surrounding a vehicle service facility using global positioning system (GPS) coordinates, wherein the geographic region is a range surrounding a particular GPS coordinate location;
- determining whether the mobile vehicle remains in the geographic region for at least a predetermined amount of time based on a time reference extracted from a GPS signal and, if so;
- transferring information relating to the operation of the mobile vehicle between the service facility and the mobile vehicle using cellular short-range wireless communication.

16. The method of claim 15, wherein the information includes vehicle service data and the service facility is a vehicle service facility, and wherein the transferring step further comprises transferring the vehicle service data from the mobile vehicle to the service facility.

17. The method of claim 16, wherein the vehicle service data includes diagnostic trouble codes.

18. The method of claim 15, wherein the transferring step further comprises transferring the information from the service facility to the mobile vehicle.

19. A method of establishing communication with a mobile vehicle, the method comprising:
(a) establishing a predetermined geographic region defined by a communication range that surrounds a mobile vehicle dealership;
(b) generating a communication initiation request from a mobile vehicle to the mobile vehicle dealership;
(c) receiving the communication initiation request from the vehicle at the mobile vehicle dealership;
(d) determining if the time at which the communication initiation request is received is within a predetermined time range; and, if so:
  (i) initiating a time trigger;
  (ii) determining if the mobile vehicle remains within the communication range that surrounds the mobile vehicle dealership after the expiration of the time trigger; and
  (iii) communicating information relating to the operation of the mobile vehicle between the mobile vehicle and the mobile vehicle dealership if the mobile vehicle is within the communication range that surrounds the mobile vehicle dealership after the expiration of the time trigger.

* * * * *